United States Patent Office 3,303,043
Patented Feb. 7, 1967

3,303,043
CHROMATOPLATE FOR USE IN THIN LAYER CHROMATOGRAPHY
Herbert Halpaap, Jugenheim, Bergstrasse, and Walter Reich, Hubert Rössler, and Dieter Waldi, Darmstadt, Germany, assignors to E. Merck Aktiengesellschaft, Darmstadt, Germany
No Drawing. Filed Mar. 6, 1963, Ser. No. 263,117
Claims priority, application Germany, June 9, 1962, M 53,170
10 Claims. (Cl. 117—33.5)

The present invention relates to an improved adsorbent for plate chromatography, especially for thin layer chromatography.

The commonly used adsorbents suitable for plate chromatography are silica gel, siliceous earth, and aluminum oxide. It has become apparent, however, that layers of the pure adsorbents as silica gel, siliceous earth or aluminum oxide which have to be used in fine-particle size do not sufficiently adhere to the glass plates on which they are spread. Such layers are sensitive against mechanical influences, and when the plate is dipped into the solvent or solvent mixture used for development, it often happens that the lower part of the layer detaches, and thus the chromatogram remains incompletely developed.

To counteract these difficulties, Meinhard and Hall (Analytical Chemistry, vol. 21, 1949, page 185) added starch to increase the adherence of the adsorbent. By another technique, gypsum has been applied to stabilize the layer (Kirchner et al., Analytical Chemistry, vol. 23, 1951, page 420, and also Stahl, Chemiker-Zeitung, vol. 82, 1958, page 323). However, the addition of these additives resulted in still other problems.

When the layers are prepared, the adsorbent is mixed with water to a homogenous paste which is then spread on glass plates. Therefore, attempts have been made to increase the adherence of the adsorbents by addition of organic substances soluble or swellable in water. With a number of such additives, adherent layers can indeed be obtained; these, however, have the disadvantage of becoming more or less grey after having been sprayed with acids and subsequently warmed—a method frequently used to make the substance spots visible—so that the developed spots become indistinguishable from the grey background. For this reason, organic adherents in many cases are not suitable in plate chromatography, particularly thin layer chromatography.

Substances forming slightly soluble calcium salts or sulfates are held back at the starting point of the chromatogram when the layers contain gypsum as an adherent. Therefore, gypsum is not a suitable adherent for the chromatography of inorganic substances, particularly since layers containing gypsum detach in the water or aqueous solutions used for developing (cf. Helv. Chim. Acta., vol. 43, 1960, page 1939, and vol. 44, 1961, pages 939, 941, 1282 and 1753).

The object of this invention is, therefore, to provide a new adsorbent for plate chromatography, particularly thin layer chromatography, which adsorbent substantially eliminates the hereinbefore described disadvantages.

Another object is to provide a process for producing the novel adsorbent.

Still another object is to provide a paste composition for applying the adsorbent.

A still further object is to provide adsorbent compositions containing UV luminescent materials.

Another object is to provide novel chromatostrips or chromatoplates based on the novel adsorbent of this invention.

Still additional objects and advantages of this invention will become apparent upon the study of the specification and appended claims.

To attain the objects of this invention, it has now been found that an adsorbent suitable for plate chromatography, particularly for thin layer chromatography, can be obtained which exhibits an outstanding adherence to the plate by using an adsorbent on the basis of silica gel, or siliceous earth, or aluminum oxide, containing 2 to 30%, preferably 3 to 10% by weight, of silicon dioxide having a particle size of 3 to 50 m$\mu$. Layers of such adsorbents spread on glass plates exhibit an excellent adherence in all solvents used for development and also remain sufficiently adherent when subjected to the ordinary mechanical forces associated with plate chromatographic processes.

Silicon dioxide of a particle size of 3 to 50 m$\mu$ is an article of commerce, and can be manufactured, for example, by thermohydrolysis of silicon tetrachloride. As a rule, it is used to increase the flowability of powdery substances. Thus, it serves for instance to prevent the agglomeration and fritting of powders of all kinds.

It is, thus, all the more surprising that silcon dioxide of extremely fine particle size increases the adherence of silica gel, siliceous earth, or aluminum oxide to smooth surfaces, particularly to glass plates, when it is added to such carriers in an amount between 2 and 30%. This effect is contrary to all known properties of silicon dioxide having such a fine particle size.

The adsorbents according to this invention can be used not only for thin layer chromatography (thickness of layers up to 500$\mu$), but they are also suitable as adsorbents for plate chromatography to perform production scale separations. In this case, thicker layers (usually 0.5 to 4 mm.) are applied. In general, therefore, this invention is especially advantageous for adsorbent layers of about 50$\mu$ to about 4 mm.

Besides siliceous earth and aluminum oxide, silica gel is particularly preferred for the manufacture of adsorbents according to this invention. For this purpose, all kinds of silica gel can be used that are available on the market, for instance those with a pore diameter between 35 and 250 A., especially between 35 and 50 A., a specific surface between 800 and 150 m.$^2$ per gram, especially between 800 and 300 m.$^2$ per gram and a pore volume between 0.4 and 1.4 cc. per gram, especially between 0.4 and 0.9 cc. per gram. The various sizes are applied according to their utility for the desired chromatographic purpose. In general, the grain size of the silica gel, as well as the siliceous earth and aluminum oxide, is in the range of about 2$\mu$ to about 60$\mu$.

All sorts of silicon dioxide of fine particle size which are available on the market can be used according to this invention, for instance, those having a particle size between 3 and 50 m$\mu$ and a specific surface between 150 and 400 m.$^2$ per gram.

The finely divided silicon dioxide has to be admixed homogeneously to the adsorbents, i.e. silica gel, siliceous earth or aluminum oxide.

Of course there are many methods to obtain this homogeneous mixture, but it is preferred to blend the ingredients in a high speed mixer until the silicon dioxide flakes are no longer discernible, as examined microscopically with a magnification of about 120 up to 600.

The adsorbent paste is then prepared by mixing 100 parts by weight of solid adsorbent with about 140 to 270 parts by weight of water.

The completed paste is then applied to glass plates to obtain a homogeneous continuous film thereon. The coated glass plates are dried in an oven at a suitable temperature to eliminate the water, the final product being called a chromatostrip or chromatoplate. If not used immediately, the final product can be stored or packaged in a dry atmosphere by conventional means. Plates with silica gel are generally activated by heating same to temperatures in the range of 104–140° C.

The glass plate of the chromatostrip or chromatoplate can be of any desired dimensions, depending on the usage of the chromatographic process. For example, for analytical work, the plates are usually 20 x 20 cm. or 20 x 5 cm.

Another advantage of the new adsorbents is that the layers prepared therefrom are more transparent than those produced by the admixture of gypsum or organic swelling agents. This improved transparency is particularly advantageous if luminescent materials are incorporated into the adsorbents for the purpose of determining the separation effect obtained by means of UV light. In this case, the layer is irradiated with ultraviolet light of a suitable wave length. The layer shows a fluorescence, and those zones containing substances which absorb in the ultraviolet region appear as dark spots. Thus it is possible to detect colorless substances on the chromatogram which are not fluorescent themselves. These substances may be isolated by detaching the corresponding parts of the layer and eluting them with suitable solvents, the substances themselves not being altered by the influence of any reageants. Preferably, magnesium tungstate or zinc silicate activated with manganese are used as luminescent materials for such purposes. However, it is obvious that any solid UV luminescent material will be operable, and in general, about 0.5 to 8 parts by weight of the material per 100 parts by weight of adsorbent (e.g. silicon dioxide and silica gel) is satisfactory. This combination of ingredients leads to a much more clearly discernible reading of the areas of adsorbence.

Without further elaboration, it is believed that one skilled in the art, can, using the preceding description, utilize the present invention to its fullest extent. The following preferred specific embodiments are, therefore, to be construed as merely illustrative, and not limitative, of the remainder of the specification and claims in any way whatsoever.

*Example 1*

250 g. of a silica gel with an approximate surface of 400 m.$^2$/g., a pore diameter of 40 A., a pore volume of 0.7 to 0.8 cc./g. and a particle size distribution of

| | Parts by weight |
|---|---|
| More than 30$\mu$ | 1.9 |
| 6–30$\mu$ | 64.4 |
| Less than 6$\mu$ | 33.7 | are mixed thoroughly under dry conditions with 50 g. of silicon dioxide having a particle size of 3–15 m$\mu$ in a high speed mixer of about 15,000 r.p.m. After about 3 minutes, the flakes of silicon dioxide have disappeared (microscopic control). Then a further 700 g. of the initially used silica gel are added in a normal mixer, about 7500 r.p.m. This addition of silica gel is continued until the mixture yields a completely homogeneous layer when it is mixed with water to form a paste suitable for thin layer chromatography. The layer is ready for use upon drying at room temperature and activation by heating it to temperatures from 104–140° C. It adheres well to the glass plates normally used.

*Example 2*

95 kg. of a silica gel with a pore diameter of approximately 40 A. are initially mixed in a normal mixer with 5 kg. of a silicon dioxide having a particle size of 3 to 15 m$\mu$. Then it is mixed portionwise in a mixer having a number of revolutions of about 2800/min. until flakes of silicon dioxide are no longer visible in the microscope. When used in thin layer chromatography, this material yields highly homogeneous layers on plates.

*Example 3*

9.5 kg. of a mixture obtained according to the method described in Example 2 are mixed in a mixer having a high number of revolutions with 500 g. of magnesium tungstate. The thin layers produced therefrom are homogeneous and show a bluish-white fluorescence when irradiated by a short wave UV-lamp. They are most suitable in chromatographing substances which absorb in the UV region.

*Example 4*

200 g. of zinc silicate activated with manganese are added in the manner described in Example 3 to 9.8 kg. of the mixture prepared according to the method described in Example 2. Thin layers prepared from this material are completely homogeneous and show a green fluorescence when irradiated with short wave UV-lights. They are thus suitable for the chromatography of UV absorbing substances. Other UV luminescent materials can be substituted for the activated silicate, for example, cadmium halogenophosphate activated with manganese, calcium-phosphate activated with tin, calcium silicate activated with manganese or with manganese and lead, calcium halogenophosphate activated with antimony or with antimony and manganese.

*Example 5*

200 g. of zinc silicate activated with manganese are added in the manner described in Example 3 to 9.8 kg. of the mixture prepared according to the method described in Example 2. 30 g. of this material are mixed with 65–70 ml. deionized water preferably by violent shaking in an Erlenmeyer flask. This suspension is poured by means of a suitable applicator on a row of five to six glass plates (20 x 20 cm.) thoroughly cleaned and of uniform thickness to produce a homogeneous layer of about 400$\mu$. After application, the plates are dried and activated at about 120° C. They are thus suitable for the thin layer chromatography especially for UV absorbing substances. Instead of the activated silicate, other UV luminescent inorganic materials as described in Example 4 may be used.

*Example 6*

200 g. of zinc silicate activated with manganese are added in the manner described in Example 3 to 9.8 kg. of the mixture prepared according to the method described in Example 2. 800 g. of this material are mixed with about 1600 ml. deionized water to a just pourable homogeneous mass by violent shaking in a round flask. This suspension is either spread by means of a suitable applicator or poured from a glass cylinder (for each plate 400 ml.) on a row of 5 glass plates (100 cm. x 20 cm.) of about 6 mm. thickness to produce a homogeneous layer of 2 mm. In the course of pouring the glass plate is in a suitable frame of wood or plastic material which is tightened at the sides and on the bottom with synthetic foam rubber. After application the horizontal lying plates are dried in a dustless air for several hours until the mass has assumed a white color. Then they are activated at about 120° C. for 3 hours. They are thus suitable for preparative plate chromatography. Instead of the activated silicate, other UV luminescent inorganic materials as described in Example 4 may be used.

In this invention, the term siliceous earth is intended to define an adsorbent on the basis of diatomaceous earth (diatomaceous silica, kieselguhr) of different kinds but always of natural origin.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A chromatostrip consisting essentially of a flat, smooth support and superimposed thereon a coating of a thickness of about $50\mu$ to about 4 mm. of an adsorbent composition comprising in percent by weight, 98–70% of a member selected from the group consisting of silica gel, siliceous earth and aluminum oxide, said member having a particle size in the range of about $2\mu$ to about $60\mu$, and 2–30% of silicon dioxide having a particle size of 3–50 m$\mu$.

2. The chromatostrip of claim 1 wherein the concentration of the silicon dioxide in the composition is 3–10%.

3. The chromatostrip of claim 1 wherein said member is silica gel.

4. The chromatostrip of claim 1, further comprising a small quantity of a UV luminescent material in the adsorbent composition.

5. The chromatostrip of claim 1, further comprising a UV luminescent material selected from the group consisting of magnesium tungstate, zinc silicate activated with manganese, cadmium halogenophosphate activated with manganese, calcium phosphate activated with tin, calcium silicate activated with manganese, calcium silicate activated with manganese and lead, calcium halogenophosphate activated with antimony, and calcium halogenophosphate activated with antimony and manganese, said UV luminescent material being present in an amount of about 0.5 to 8 parts by weight per 100 parts by weight of the adsorbent.

6. A chromatoplate comprising a glass plate and superimposed thereon a coating of a thickness of about $50\mu$ to about 4 mm. of an adsorbent composition comprising in percent by weight, 98–70% of a member selected from the group consisting of silica gel, siliceous earth and aluminum oxide, said member having a particle size in the range of about $2\mu$ to about $60\mu$, and 2–30% of silicon dioxide having a particle size of 3–50 m$\mu$.

7. The chromatoplate of claim 6, wherein the concentration of the silicon dioxide in the composition is 3–10%.

8. The chromatoplate of claim 6, wherein said member is silica gel.

9. The chromatoplate of claim 6, further comprising a small quantity of a UV luminescent material in the adsorbent composition.

10. The chromatoplate of claim 6, further comprising a UV luminescent material selected from the group consisting of magnesium tungstate, zinc silicate activated with manganese, cadmium halogenophosphate activated with manganese, calcium phosphate activated with tin, calcium silicate activated with manganese, calcium silicate activated with manganese and lead, calcium halogenophosphate activated with antimony, said calcium halogenophosphate activated with antimony and manganese, said UV luminescent material being present in an amount of about 0.5 to 8 parts by weight per 100 parts by weight of the adsorbent.

References Cited by the Examiner

UNITED STATES PATENTS

| | | | |
|---|---|---|---|
| 2,907,679 | 10/1959 | Smith | 117—169 |
| 2,941,958 | 6/1960 | Connor et al. | 252—449 |
| 3,072,563 | 1/1963 | Hickson | 252—301.4 |
| 3,097,103 | 7/1963 | Homer et al. | 252—301.3 |

WILLIAM D. MARTIN, *Primary Examiner.*

MAURICE A. BRINDISI, *Examiner.*

R. D. EDMONDS, S. W. ROTHSTEIN,
*Assistant Examiners.*